June 26, 1923.
T. A. RIANDA
COMBINED TIRE CARRIER AND COVER
Filed Nov. 22, 1921   3 Sheets-Sheet 1
1,460,274
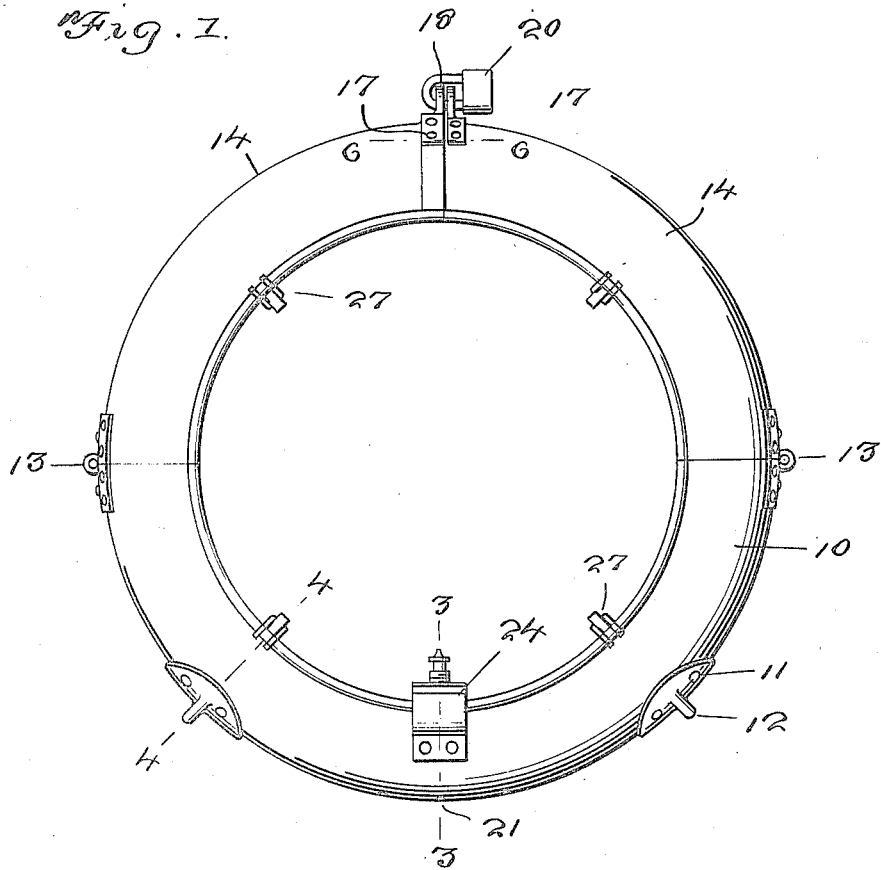
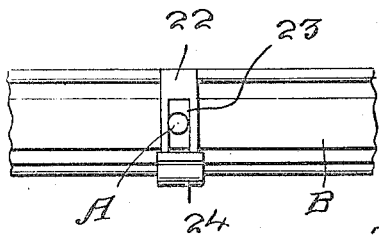

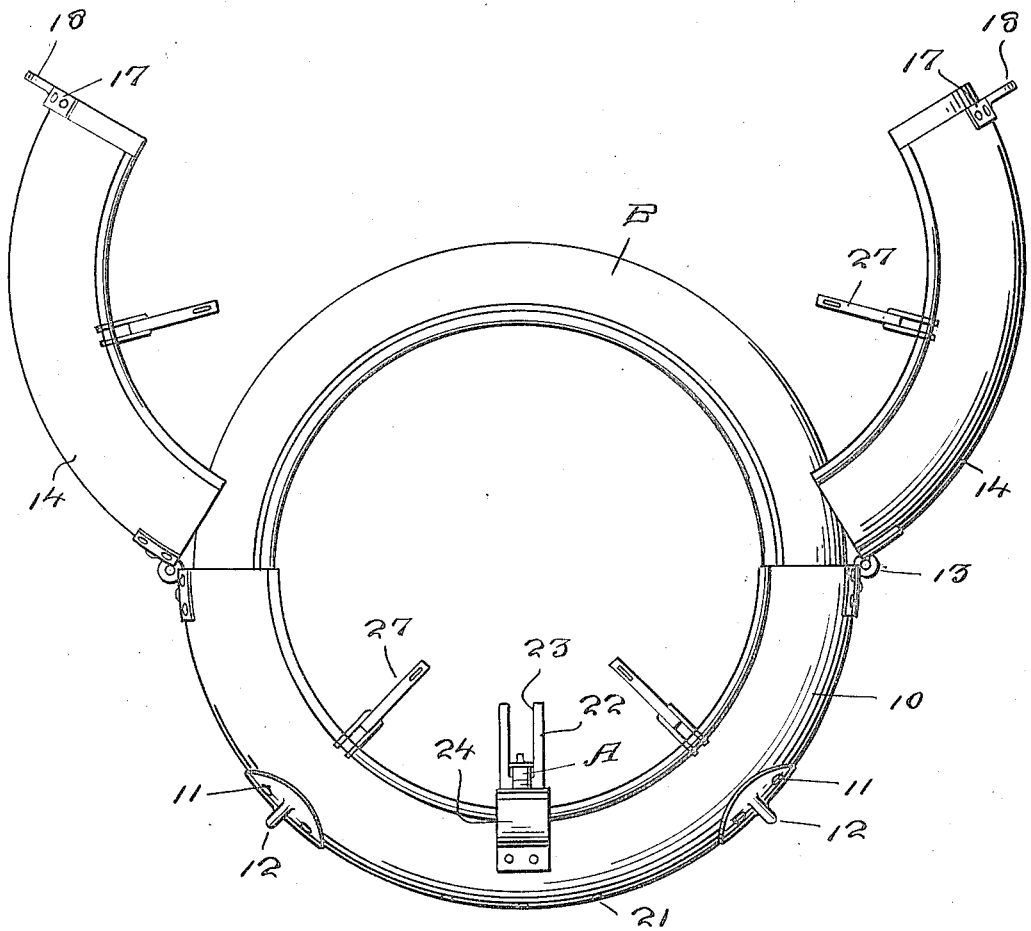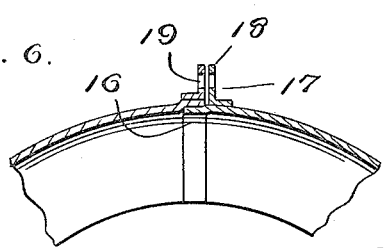

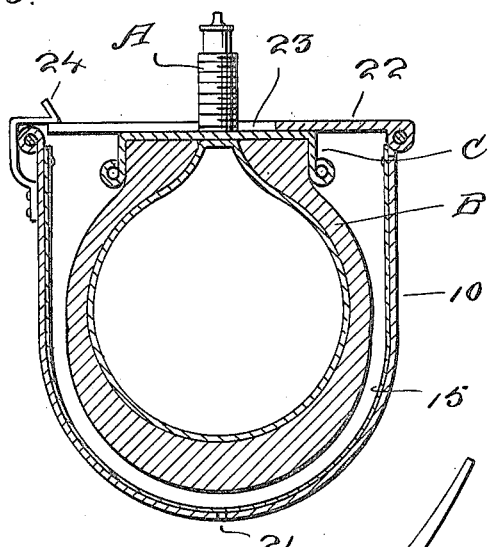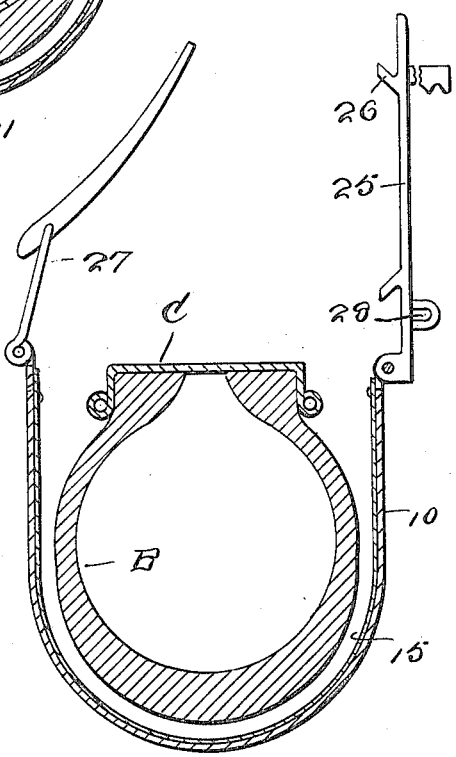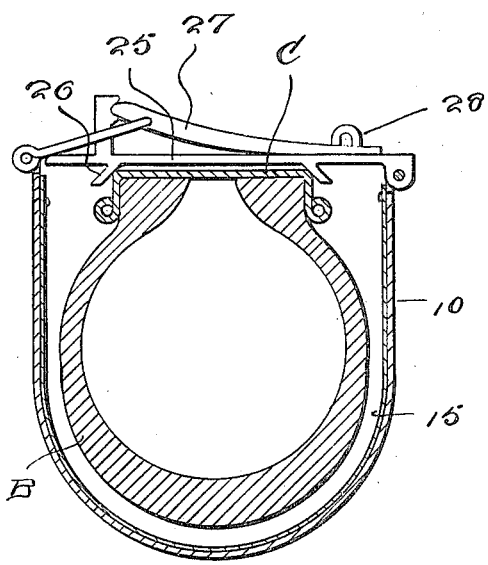

Patented June 26, 1923.

1,460,274

UNITED STATES PATENT OFFICE.

THOMAS A. RIANDA, OF GONZALES, CALIFORNIA.

COMBINED TIRE CARRIER AND COVER.

Application filed November 22, 1921. Serial No. 517,132.

*To all whom it may concern:*

Be it known that I, THOMAS A. RIANDA, a citizen of the United States, residing at Gonzales, in the county of Monterey and State of California, have invented new and useful Improvements in Combined Tire Carriers and Covers, of which the following is a specification.

This invention relates to automobile accessories, particularly to tire carriers, and has for its object the provision of a novel device designed to carry a spare tire and so formed as to enclose the tire completely and consequently protect it against injury caused by exposure to snow and rain.

An important object is the provision of a device of this character which is so constructed that when in closed position it will effectively operate to protect the tire from would be thieves, very efficient locking means being provided which is well calculated to discourage attempts to remove the tire from the device.

Another important object is the provision of a device of this character which is equally well adapted for carrying tires of ordinary size, over sized tires and also retreaded tires, it being well known that this latter type varies in size from both of the former types, the device being provided with means engaging the rim upon which the tire is mounted for holding the tire centered with respect to the cover so as to avoid rubbing of the tire against the inner periphery of the cover.

Another object is the provision of a cover of this character in which the centering members may be provided with individual locks for preventing theft.

Still another object is the provision of means engaging the valve stem whereby to prevent circumferential movement of the tire within the carrier, the carrier being furthermore provided with drain holes for permitting of the outlet of any rain water which might accumulate in the cover.

An additional object is the provision of a combined device of this character which may be mounted upon any desired part of an automobile, which will be comparatively simple and inexpensive in manufacture, which may be very easily operated by the proper person for effecting removal of a tire therefrom, which will be attractive in appearance, efficient and durable in service and a general improvement in the art.

With the above and other objects and advantages in view, the invention consists in the details of construction to be hereinafter more fully described and claimed, and illustrated in the accompanying drawings in which:—

Figure 1 is an elevation of my device in closed position.

Figure 2 is a similar view in open position.

Figure 3 is an enlarged cross sectional view on the line 3—3 of Figure 1.

Figure 4 is a cross sectional view on the line 4—4 of Figure 1 showing the centering device in locked position.

Figure 5 is a similar view showing the centering device in disengaged position.

Figure 6 is a detail cross sectional view on the line 6—6 of Figure 1.

Figure 7 is a detail plan view of the lower portion of the device showing the means engaging the valve stem for preventing circumferential creeping of the tire within the device.

Referring more particularly to the drawings I have shown my device as comprising a semi-circular shell 10 which may be provided at various points with reinforcements 11 to which are secured suitable arms or braces 12 by means of which the device may be secured to the desired location on a vehicle This shell 10 is of trough-like form in cross section and must be of such dimensions as to receive a tire mounted upon a rim with the radius of the inner edges of the shell sufficiently small that the shell will cover the entire side walls of a tire disposed therein.

Hinged upon the upper ends of the shell 10 as shown at 13 are movable shells 14, each of which is a quarter of a circle so that when these shell members 14 are swung to bring their free ends together they will cooperate with the bottom shell 10 to form a complete ring for entirely enclosing a tire. The shell 10 and the shell members 14 are all of similar construction and are formed preferably of sheet metal such as iron or steel having the outside suitably enameled or painted and having the inside lined with canvas indicated at 15, this canvas being held in position as for instance by means of rivets.

The free end of one shell member 14 is slightly offset inwardly as shown at 16 to provide a flange fitting into the free end of the other section or member and secured upon the free ends of both sections are brackets 17 having extensions 18 formed with holes 19 adapted to be brought into registration and serving for the passage of the shackle of a padlock 20.

The bottom shell 10 is formed at its lowest portion with a plurality of holes 21 of suitable size, which are for the purpose of permitting the running out of any rain water which might accumulate within the device.

In order to prevent circumferential movement of a tire within the cover, I provide a bar 22 which is hinged upon one edge of the bottom shell 10 at the center thereof and which has an elongated slot 23 for the passage of the valve stem A of a tire B disposed within the device. I also prefer to employ a small spring catch 24 engageable by the free end of the bar or plate 22 for holding it against movement so as to prevent actual disengagement.

It is well known that retreaded tires are not necessarily of the same diameter as original tires and it is also well known that the owner of a car frequently changes from regular sized tires to over sized tires. My device is adapted for carrying and enclosing any of these three types of tires as I have provided special means for holding the tire centered with respect to the cover. This means comprises a plurality of bars 25 hinged upon the inner edge of the shell 10 and shell members 14. Carried by these bars 25 are projections 26 which engage against the inner periphery of the rim C upon which the tire is mounted. The bars 25 are held in engagement with the rim by means of clamping arms 27 which are hinged upon the opposite edges of the various shell members, these arms 27 cooperating with the bars 25 in a manner similar to the action of trunk fasteners. If preferred the bars 25 and arms 27 may carry small lugs 28 having holes which register for the passage of the shackles of conventional padlocks not shown.

In the use of the device it will be seen that when the lock 20 is removed and the sections 14 are swung outwardly a tire mounted upon a rim may be placed within the lower shell member 10, it being intended that the valve stem be at the lowest possible point. The shell members 14 are swung together and may be locked by reapplying the padlock and it will then be impossible for an unauthorized person to remove the tire without breaking the lock and ordinarily this discourages the thief. The two uppermost bars 25 are then swung into engagement with the rim and are locked by means of the clamping arms 27 and then the two lower bars 25 are similarly swung and locked whereupon the tire and rim will be centered with respect to the cover so that the periphery of the tire will not touch the cover at any point. It should also be stated that the bar 22 should be swung over the valve stem and be engaged with the catch 24. In removing a tire from the device the reverse operation is of course followed and it is believed that a detailed explanation thereof is unnecessary.

From the foregoing description and a study of the drawings it will be apparent that I have thus provided a simply constructed and consequently inexpensive combined tire carrier and cover which will efficiently operate in a manner to prevent the tire from efforts of thieves but which will also prevent the tire from being damaged by snow and rain. It is thus evident that the device will very efficiently perform the functions for which it is intended and that it should be satisfactory in every respect.

While I have shown and described the preferred embodiment of the invention it is of course to be understood that I reserve the right to make such changes in the form, construction and arrangement of parts as will not depart from the spirit of the invention or the scope of the subjoined claims.

Having described the invention I claim:—

1. A device of the character described comprising a relatively stationary shell member of semi-circular form adapted to support a tire, a pair of quarter-circular shell members hingedly connected with the ends of said first named shell member, and means for securing together the free ends of the last named shell sections in interengaging relation, the assembled sections being adapted to entirely enclose a tire mounted upon a rim, and means engaging the rim for centering the tire with respect to the assembled sections whereby to hold the tire spaced away from the shell at all points.

2. A device of the character described comprising a relatively stationary shell member of semi-circular form adapted to support a tire, a pair of quarter-circular shell members hingedly connected with the ends of said first named shell member, and means for securing together the free ends of the last named shell sections in interengaging relation, the assembled sections being adapted to entirely enclose a tire mounted upon a rim, and means engaging the rim for centering the tire with respect to the assembled sections whereby to space the tire from the shell at all points, and means carried by the shell for holding the tire and rim against circumferential movement.

3. A device of the character described comprising a lower shell member of semi-circular shape and trough-shaped in cross section designed to be supported to be relatively stationary, a pair of shell members of quarter-circular shape hinged upon the ends of said first named shell member and having their free ends adapted for interfitting engagement, said first named shell member being designed to support a tire mounted upon a rim and the second named shell members co-operating with the first named shell member for entirely enclosing the tire, and means carried by the first named shell member engaging the valve stem of the tire for preventing circumferential movement of the tire with respect to the cover.

4. A device of the character described comprising a lower shell member of semicircular shape and trough-shaped in cross section designed to be supported to be relatively stationary, a pair of shell members of quarter-circular shape and hinged upon the ends of said first named shell member and having their free ends adapted for interfitting engagement, said first named shell member being designed to support a tire mounted upon a rim and the second named shell members co-operating with the first named shell member for entirely enclosing the tire, and means carried by the first named shell member for preventing circumferential movement of the tire with respect to the cover, said means comprising a plate hinged upon an edge of the section and formed with a slot for the passage of the valve stem of the tire, and a catch member engaging the free end of said plate.

In testimony whereof I affix my signature.

THOMAS A. RIANDA.